Figure 1:
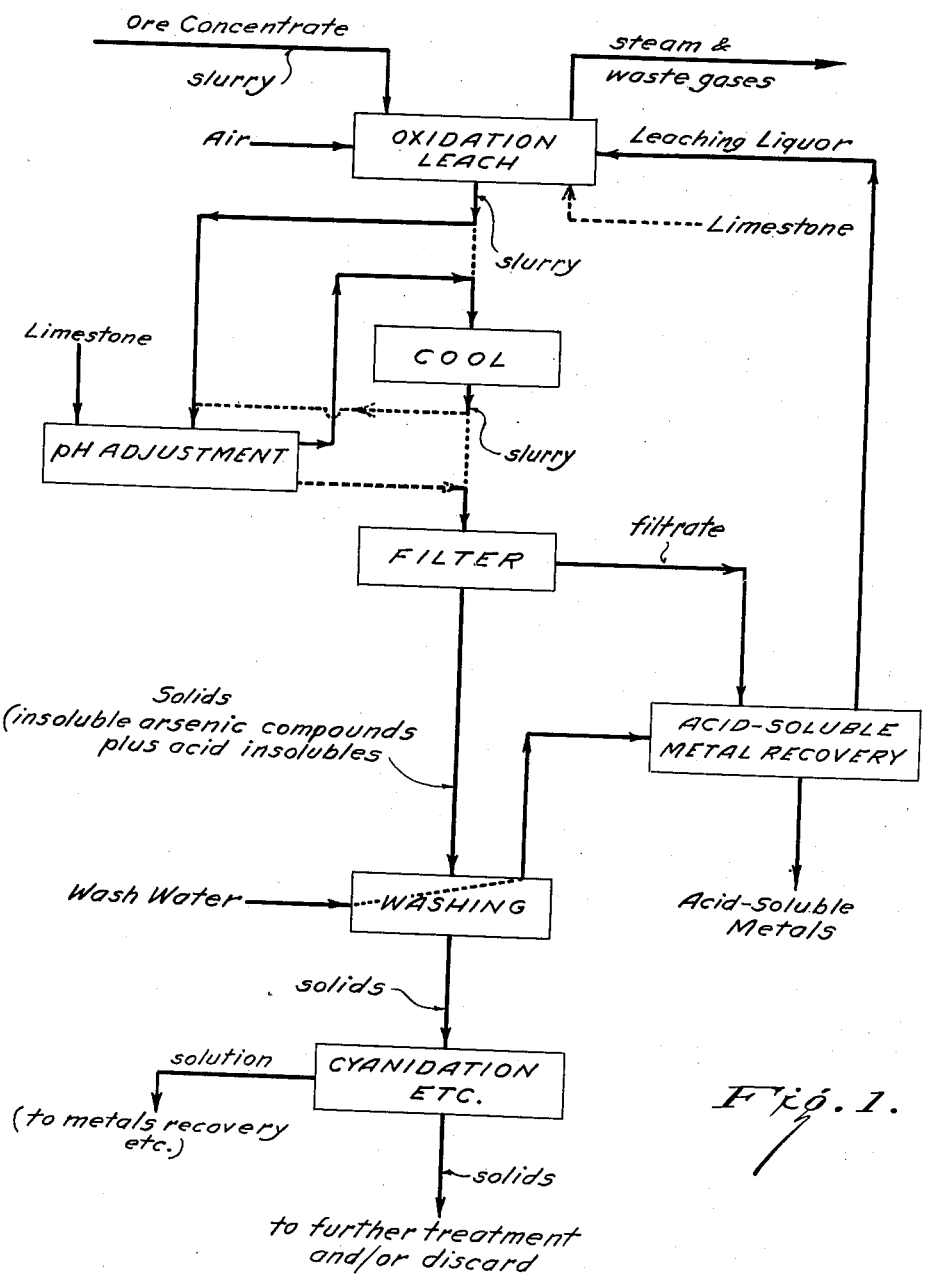

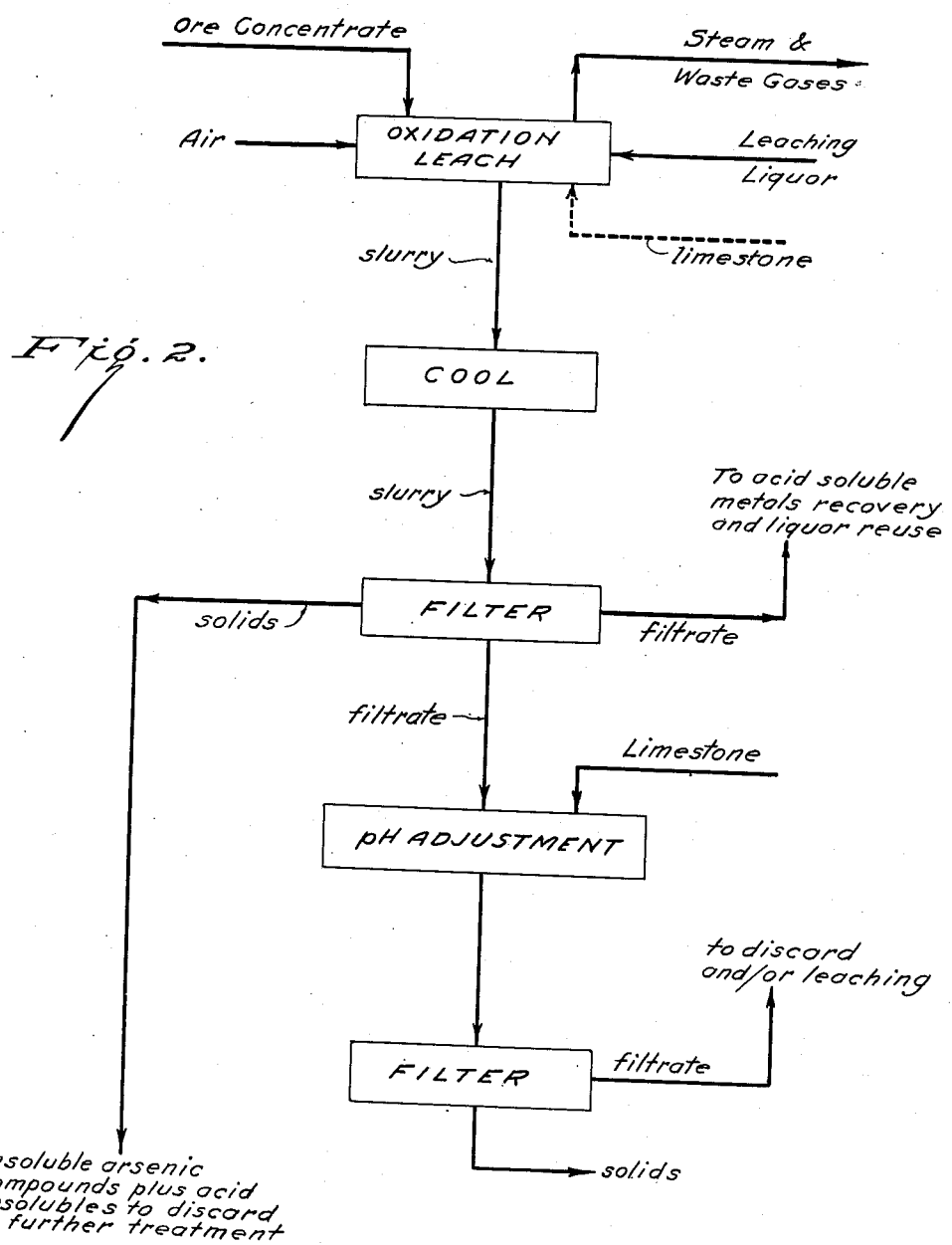

Patented Aug. 10, 1954

2,686,114

UNITED STATES PATENT OFFICE 2,686,114

ELIMINATION OF ARSENIC FROM METALLIC ARSENIDE-SULFIDE CONCENTRATES

Patrick J. McGauley, Glen Cove, and Felix A. Schaufelberger, Pelham, N. Y., assignors to Chemical Construction Corporation, New York, N. Y., a corporation of Delaware Application January 19, 1951, Serial No. 206,891

13 Claims. (Cl. 75—6)

The present invention is concerned with the recovery of metals from arsenic-containing metallic ores. It is further concerned with the recovery of non-ferrous metals from ores containing arsenic-complex minerals. It is more specifically concerned with a process of treating arsenic-containing ores of ferrous and/or non-ferrous metals, whereby the arsenic may be completely eliminated in a form suitable for ready industrial disposal.

Many ores, otherwise valuable, are not mined and treated only because of their high arsenic content. Particularly is this true with respect to many gold, silver, platinum, radium, uranium, nickel and cobalt complex ores, which are often contained in, or associated with, iron and arsenic minerals, such as arsenopyrite. This problem is also presented by many copper ores and, to a lesser degree, some iron and pyritic "sulfur" ores.

Industrially, this reluctance to attempt to process ores having an appreciable arsenic content is based on a number of technical and economic factors. For example, most conventional metallurgical processes for the recovery from such ores of valuable metals involve the oxidation and removal of arsenic by volatilization. This is done usually in mechanically-rabbled roasters. Since the most volatile arsenic compound formed in this treatment is an intermediate oxide, to eliminate any appreciable bulk of arsenic, the roasting must be very carefully controlled between oxidizing and reducing conditions. Of necessity, therefore, roasting for complete arsenic removal is a slow, repetitive and expensive operation.

A further complication arises from the poisonous nature of the products. Arsenic oxides are extremely poisonous both to animal and to vegetable life. Accordingly, in almost any location, they must be removed completely from the flue gases. Removal and collection of the arsenic is expensive and requires extensive equipment. Ordinarily, too, there is little or no market for the product. Since $As_2O_3$ is somewhat soluble, disposal of arsenic fume is a most serious problem. A surface or underground dump, for example, always involves a danger of poisoning the water supply of a large area. The only present commercial methods of safely disposing of arsenic is to combine it with iron as an insoluble speiss, which can be safely and openly disposed of, or to dump the oxide from ships far out at sea. Both operations are expensive.

In recent years, there has been a steadily-increasing demand for many metals of which the available minerals are commonly associated physically or chemically with arsenic, sulfur and usually iron. It is, therefore, a principal object of the present invention to devise a procedure which will permit a simple, rapid and complete extraction of the valuable metal or metals from such ores. A still further object is to obtain the elimination of arsenic in a form suitable for ready disposal, without incurring either potential hazards or prohibitive costs.

In the present invention, these objects are accomplished in a surprisingly straightforward procedure. The arsenic removal operation of the present invention may be best illustrated in conjunction with the accompanying drawings. Figure 1 constitutes a simplified flowsheet showing the essential steps in the operation. Figure 2 shows a useful modification thereof.

Basically, this novel process is simple. As seen in the flowsheets, an aqueous slurry of the ore is subjected to an oxidation leach, in the presence of sulfuric acid, at increased temperatures and pressures. Thereby, not only the acid-soluble metals content but also the arsenic is dissolved. Up to an equivalent of dissolved iron is promptly converted to an insoluble iron arsenate. Any additional dissolved arsenic is insolubilized with added iron, lime or some like economical source of a cation which forms an insoluble arsenate.

In this way, at pressures in excess of about 100 pounds per square inch and temperatures of about 250°–650° F.; both the arsenic and much of the iron is converted to highly insoluble, readily-disposable arsenates. Simultaneously, valuable metals, originally physically or chemically associated with the arsenic, are released. Oxidized slurry is discharged, cooled and the solution separated from the residue. Usually the latter is washed. Both the acid-insoluble residue and the solution after residue removal may be further processed.

A typical treatment of the iron-arsenic residue to recover valuable metals therefrom is shown in the application for United States Letters Patent, Serial No. 206,894, filed of even date, by one of the present inventors, P. J. McGauley, jointly with S. J. Swainson. In that application it is shown that the gold content of the original ore, after iron and arsenic removal, may be recovered by cyanidation more effectively than by present methods. This is accomplished by cyanidation, using only a part of the cyanide consumed in presently-used conventional methods.

The solution, for example, may contain such desired acid-soluble metals as copper, silver, nickel, cobalt, and the like. These may be recovered in various known ways. One example, the use of the process of the present invention in separating cobalt from arsenic complex ores, forms the subject matter of the application for United States Letters Patent, Serial No. 206,892, filed of even date by P. J. McGauley, one of the present inventors, jointly with Paul J. Masur and Val Kudryk.

The effectiveness of this arsenic removal procedure and the simplicity of its operation are particularly surprising, in view of the previously unfulfilled demand for such a process. Not only is the arsenic eliminated, much of it combined with the equally valueless iron, but the resulting chemical compounds are completely insoluble, not only in water but in the leach solution. As a result, at least some iron and substantially all the arsenic are readily collected by settling, filtration or the like. These insoluble arsenic products may be discarded, even into an open tailings pond, without undue water pollution hazards.

One feature of the invention should be noted. Whereas in the past, the presence of arsenic has been considered a distinct drawback, in the present process it is of definite advantage. Common ores of cobalt, nickel or copper frequently contain large amounts of excess iron. It is desirable to prevent iron from dissolving in the leach liquor in excessive amounts. In the present process, arsenic serves the important function of precipitating large amounts of iron from solution, thereby reducing to a considerable degree any necessity for an iron removal step to be performed later.

As shown in the drawings, in most operations the feed material will consist of a minerals concentrate. In some cases, this will have been made especially for recovery of a particular metal content using the present process. In others, this concentrate will result from previous selective concentration for other purposes of other minerals contained in the original ore. In any case, it will constitute some type of concentrate, from which at least gangue constituents have been partly eliminated to reduce the bulk which must be handled. Various processes for these purposes are well known and form no part of the present invention.

Physical size of the particles in the concentrate to be treated has an effect on the overall process. However, so far as the present process is concerned, it is not necessary to reduce the particle size below that which is necessary to separate the mineral values from the waste rock and permit convenient transfer as a water slurry.

Liquid for slurrying and leaching the particles may be water since sulfuric acid is generated during the oxidation leach if the concentrate contains sulfur. However, the initial presence of some acid aids in initiating the reactions. Consequently, a dilute sulfuric acid solution is preferable and usually is used. Of course, another cheap mineral acid could be added for initiating reaction but it would be wasteful to do so. Adequate quantities of suitable sulfuric acid liquor is available as recycled solution produced in other steps of the overall processing, for example, in metals recovery steps which below will be discussed further. The sulfuric acid content of this recycled liquor may be very low, even almost barren. More than enough sulfuric acid to complete the necessary reactions is formed during the oxidation leaching in almost all cases.

With regard to the amount of acid in the leach solution sent to the oxidation treatment, one factor should be noted. A low degree of acidity favors arsenic elimination. While the invention is not necessarily limited thereto, it has been found, for example, in an illustrative case of a cobalt extraction from cobaltite ores, that high cobalt extraction is obtained with a very low arsenic extraction when the leach solution contains not more than about 5–8% sulfuric acid before oxidation. Therefore, it is preferable that the acid content should not greatly exceed about 10%. It should be also below a pH of about 4.5.

Particulate feed material, usually fed as a slurry, is subjected to the primary or oxidation leaching operation under pressurized conditions at elevated temperatures. The total pressure on the operating vessel may be as low as about 100 pounds per square inch, in this operation. However, in general, a temperature somewhat higher than the equivalent temperature at these lower pressures is to be preferred. Based on the economy of operation and the strength of common vessels, the preferable temperature range is from about 250°–550° F. The pressure must be equivalent thereto, usually about 400–650 pounds per square inch. There is no reason why higher temperatures and pressures cannot be used, if facilities are available for generating and handling them. Ordinarily, however, increased benefits therefrom are not commensurate with increased costs.

Oxidation per se is carried out by blowing an oxidizing gas through the slurry in the pressure vessel. For this purpose, oxygen gas is to be prefererred. However, for various reasons the economic conditions may prevent its use. Oxygen-enriched air, or air alone may be used satisfactorily. In the latter usages there is a drawback in the appreciable difference in volumes to be handled. An economic balance will determine the optimum for different localities and conditions.

Under oxidizing conditions, reaction is exothermic. This makes for a readily-controlled operation. Control is accomplished by bleeding steam, nitrogen and/or other waste gases from the pressure vessel in amounts sufficient to regulate the pressure and, therefore, the equivalent temperature. With many sulfide ores, sufficient steam can be obtained in this manner for various processing steps in and about the plant. In some cases, for example, this may provide for the generation of at least part of the power for compression of air for the oxidizing reaction.

Successful operation does require insolubilizing all the arsenic dissolved from the concentrate. This is usually accomplished, at least in part, by the presence of iron during the oxidation. Many concentrates will contain iron, in some cases, even in excess of the equivalents of arsenic. Some iron, usually as ferric salts, may also be available in the recycled leach liquors. When the total available iron taken to the autoclave, i. e., in the leach solution and/or as feed solids, is not equivalent to the arsenic, the deficiency must be made up. If so desired, additional iron can be readily supplied by adding cheap iron minerals, such as pyrites and the like.

However, the addition of iron and sulfur to the feed, when neither constitutes a desired constituent to be recovered, is generally undesirable. A better practice is to make use of a cheap source of alkaline earth metals. Arsenates thereof, particularly calcium and magnesium, are equally or even more insoluble than that of iron. Limestone, dolomite, and the like, may be used.

As shown in Figures 1 and 2, this addition of materials such as limestone as sources of alkaline-earth metals for a pH adjustment may be done in several ways. For example, as shown in Figure 1, it may be done by treating withdrawn oxidized leach liquor with limestone before the cooling and filtering steps. It is only necessary to treat the liquor with enough limestone to reduce the free acid content to from about a pH of 4.5 to not more than 5–8% acid content. This insures precipitation of any dissolved, unprecipitated arsenic. Preferably but not necessarily in these treatments only enough limestone is used to be completely dissolved and produce the desired result. Otherwise the acid content may be over neutralized.

However, conducting the pH adjustment before cooling and pressure relief requires it be done in a pressure vessel. To avoid this necessity the operation may be done after cooling as shown by the alternative flow lines in Figure 1. The cooled solution is led to a suitable treating tank after cooling.

A further alternative is shown in both Figures 1 and 2. As pointed out above, high metal and low arsenic extraction is favored at pH values below about 4.5 but at less than about 8–10% sulfuric acid content. Accordingly, limestone or the like may be added directly to the leaching vessel.

One other procedure should be noted. In some cases it may be desirable to discard the insoluble arsenates separately from the undissolved residue after leaching. This might well occur when the undissolved residue is to be treated for additional metals recovery as, for example, in the above noted McGauley and Swainson application. If this is desirable, the pH adjustment may be made as shown in Figure 2 after filtering out the undissolved residue. This procedure, however, does require, as shown, another filtration step or its equivalent.

The operational mechanics and conditions of actual leaching may be varied with the demands of the treatment and the nature of the concentrate or residue. It may be done in single batches. Preferably, but not necessarily, it should be conducted so as to discharge pregnant liquor continuously. For example, a battery of leaching vessels may be used stepwise. Each vessel in turn may be discharged and recharged at successive intervals, to insure a flow of treated materials to the remainder of the process. With some types of apparatus it is also possible to arrange for continuous feeding and discharge of each of the vessels.

In any case, whether operation is batchwise, stepwise, or continuous, pregnant leach discharge liquor is actually a slurry of undissolved or inert materials in a solution of dissolved sulfates. This discharged slurry should be pressure-relieved and cooled for ease in separation of the undissolved material. Sufficient cooling can be obtained simply by discharging the hot slurry through a flash tank. If so desired, provision can be made for heat-exchange, to recover sensible heat for other purposes. Such steps are contemplated in the step simply designated on the flowsheet as "cooling."

Cooled slurry is then subjected to a solids separation step, usually, but not necessarily, filtration. Other mechanical equivalents such as settling and decanting or centrifugal separation may be used. Ordinarily, the separated solids are washed to insure recovery of all soluble salts. As shown in Figure 1, the filtrate and washings are usually combined. They will now contain, as dissolved sulfates, substantially all of the original acid-soluble metals content of the concentrate.

After the solids separation, the solution will contain substantially all the acid-soluble metals as equivalent sulfates. This solution may be re-treated to recover the components in any desired manner. One such procedure, for example, is discussed in the above noted copending application of McGauley and Masur. Such a treatment is indicated only generically in the flowsheets since the details of it form no part of the process of the present invention.

As brought out by McGauley and Masur, a typical ore which might be treated would be one containing copper, cobalt, and nickel. Accordingly, the solid free solution and/or washings are sent to an operation in which the dissolved metal salt content is reduced as by precipitation, cementation and the like. The removed salts and/or metals are then treated to separate and/or purify the metals themselves. The actual metal recovery steps per se are not concerned in the present invention but are pointed out as illustrations of the usefulness of the process. Mother liquor from the salt-content reduction and metal recovery steps will be diluted acid, containing the residual salts and generally some iron salts. This mother liquor is recycled as leach liquor to the oxidation leach, which forms the first main operation in the present process.

The solids residue, which will contain gold, platinum, and the like, if any are present in the original concentrate, may be treated as by cyanidation to recover this content. Such a procedure, as noted above, is disclosed and claimed in the copending application of McGauley and Swainson. It is also indicated generically on the drawing to complete the disclosure. Any conventional cyanidation treatment, however, may be used. The exact treatment forms no part of the present invention, it being mentioned here only to show the general applicability of the arsenic-removal procedure.

The efficiency and economy of the present process in removing arsenic and the like is shown in the following examples which are given for purposes of illustration. In these examples two samples of mineral concentrates from the western United States, having the following analyses, were used.

| Constituent | Sample I | Sample II |
| --- | --- | --- |
| Arsenic | 27.6 | 19.1 |
| Sulfur | 22.8 | 19.7 |
| Iron | 16.7 | 13.7 |
| Other Acid-Soluble Metals | 19.6 | 27.8 |

*Example 1*

One part of Sample I was mixed with three parts of an aqueous leach liquor containing 10% sulfuric acid. The mixture was subjected to an autoclave treatment at approximately 460° F. The vapor pressure at this temperature was approximately 450 pounds per square inch guage. The above slurry, while hot, was treated with oxygen at a total pressure of approximately 600 pounds per square inch guage for a period of two hours. Treated slurry was removed from the autoclave and the solids collected, washed and dried. Analysis thereof showed the treated solids to contain approximately 99% of the arsenic, 98% of the iron and 27% of the sulfur, all in a highly insoluble form. The solids-free liquor contained virtually substantially one hundred percent of the copper and nickel and over 98% of the cobalt originally present in the raw concentrates.

Example 2

One part iron pyrites was added to ten parts of Sample I, giving a composite solid sample containing a ratio of about one mole of iron to one of arsenic. This mixture was slurried with three parts of water and the resulting pulp was charged to an autoclave and subjected to a temperature of 450° F. in contact with oxygen at a total pressure of 600 pounds per square inch guage for two hours. The oxygen partial pressure was approximately 150 pounds per square inch guage. The treated slurry was pressure relieved and cooled in a flash tank and a slurry of limestone added to neutralize the excess acid produced during the autoclave treatment.

The combined slurry was removed from the autoclave, the solids were separated from the liquid, washed, and dried. Analysis of the dried solids showed them to contain over 99.9% of the arsenic, more than 99.9% of the iron and 52% of the sulfur, all in a highly insoluble form. The liquid contained substantially all of the copper and nickel and over 98% of the cobalt originally present in the raw concentrates.

Example 3

One part of Sample II was treated in the same manner as Sample I in Example 1. Analyses of the treated solids showed a content of over 99% of the arsenic, 98% of the iron and 20% of the sulfur in a highly insoluble form. The solids-free liquid contained virtually one hundred percent of the copper, nickel, zinc and over 99% of the cobalt found in the original ore concentrate.

We claim:

1. In the removal of arsenic from particulate sulfide-arsenide ore concentrates containing non-ferrous metals, sulfur and arsenic; the procedure for eliminating arsenic which comprises: admixing the particles with an aqueous sulfuric acid leach liquor to form a slurry, heating the slurry at a temperature from about 250° F. to about 650° F. and under a pressure at least equal to the vapor pressure of the slurry at the reaction temperature with introduction of an oxygen-containing gas, and continuing the heating until the dissolution of non-ferrous metals is substantially complete and substantially all of the arsenic is oxidized, said aqueous sulfuric acid leach liquor having an acid content greater than pH 4.5 but less than about 10% free acid.

2. A process according to claim 1 in which the aqueous sulfuric acid is obtained by recirculation from previous operations.

3. In the removal of arsenic from particulate sulfide-arsenide ore concentrates containing non-ferrous metals, sulfur and arsenic; the procedure for eliminating arsenic which comprises: admixing the particles with an aqueous sulfuric acid leach liquor to form a slurry, at a temperature of from about 250° F. to about 650° F. and under a pressure at least equal to the vapor pressure of the slurry at the reaction temperature, treating the slurry with an oxygen-containing gas, continuing the treatment until the dissolution of non-ferrous metals is substantially complete and substantially all of the arsenic is oxidized; at acidic conditions stronger than pH 4.5 but less than about 10% free acid treating oxidized slurry with a material selected from the group consisting of compounds of iron and the alkaline-earth metals in amount sufficient to furnish said iron or alkaline-earth metals in at least a stoichiometric equivalent of the dissolved arsenic.

4. A process according to claim 3 in which at least a portion of the arsenate-forming cation requirement is furnished by an iron mineral in the ore concentrate.

5. A process according to claim 4 in which additional iron mineral is added to the slurry to provide cations available to convert oxidized arsenic to insoluble arsenic derivatives.

6. A process according to claim 3 in which additional available iron is present as dissolved salts in the aqueous leach liquor.

7. A process according to claim 3 in which at least a part of the leach liquor after oxidation is treated with an acid-neutralizing source of alkaline-earth metal compounds to neutralize excess acid and precipitate dissolved arsenic as insoluble alkaline-earth metal arsenic compound.

8. A process according to claim 3 in which at least a part of the leach liquor after oxidation is treated with an acid-neutralizing source of alkaline-earth metal compound to neutralize excess acid and precipitate dissolved arsenic as insoluble alkaline-earth metal arsenic compound, the amount of alkaline-earth metal compound added being sufficient to reduce the free acid content to below 8% but insufficient to produce a pH above about 4.5.

9. A process according to claim 8 in which the alkaline-earth metal compound is a calcium compound.

10. A process according to claim 8 in which the alkaline-earth metal compound is a limestone.

11. A process according to claim 8 in which partial neutralization is carried out during the oxidation leaching.

12. A process according to claim 8 in which partial neutralization is carried out after the oxidation leaching.

13. In the removal of arsenic from particulate sulfide-arsenide ore concentrates containing iron, non-ferrous metals, sulfur and arsenic; the procedure for eliminating arsenic which comprises: admixing the particles with an aqueous sulfuric acid leach liquor to form a slurry, at a temperature of from about 250° F. to about 650° F. and under a pressure at least equal to the vapor pressure of the slurry at the reaction temperature, treating the slurry with an oxygen-containing gas, continuing the treatment until the dissolution of non-ferrous metals is substantially complete and substantially all of the arsenic is oxidized; removing the undissolved residue and at acid conditions stronger than pH 4.5 but less than about 10% free acid treating oxidized slurry with a material selected from the group consisting of compounds of iron and the alkaline-earth metals in amounts sufficient to furnish said iron or alkaline earth metals in at least a stoichiometric equivalent of the dissolved arsenic.

References Cited in the file of this patent

UNITED STATES PATENTS

| Number | Name | Date |
|---|---|---|
| 824,699 | Atkinson | July 3, 1906 |
| 981,451 | McKechnie et al. | Jan. 10, 1911 |
| 1,188,705 | Vadner | June 27, 1916 |
| 1,364,573 | Moore | Jan. 4, 1921 |
| 2,379,659 | Schaal | July 3, 1945 |
| 2,586,649 | Hart | Feb. 19, 1952 |

OTHER REFERENCES

Handbook of Nonferrous Metallurgy, Recovery of Metals, by Liddell. Pages 103, 587–590. Published, 1945, by McGraw-Hill Book Co., Inc., New York.